United States Patent [19]
Kudoh

[11] Patent Number: 5,925,304
[45] Date of Patent: Jul. 20, 1999

[54] METHOD FOR PRODUCING A HEEL MAT-ATTACHED FLOOR RUG FOR A MOTOR VEHICLE

[75] Inventor: Hiroaki Kudoh, Ayase, Japan

[73] Assignee: Ikeda Bussan Co., Ltd., Ayase, Japan

[21] Appl. No.: 08/896,143

[22] Filed: Jul. 17, 1997

Related U.S. Application Data

[63] Continuation of application No. 08/485,835, Jun. 7, 1995, abandoned.

[30] Foreign Application Priority Data

Jun. 14, 1994 [JP] Japan .................................. 6-155402

[51] Int. Cl.$^6$ ............................ B29C 51/00; B32B 31/20
[52] U.S. Cl. .......................... 264/487; 264/511; 264/546; 264/554; 264/263; 264/259; 264/132; 264/257; 156/273.7; 156/274.4; 156/272.4; 156/309.6; 156/245; 156/72; 156/214
[58] Field of Search ................................. 264/487, 511, 264/546, 554, 263, 259, 132, 257; 156/273.7, 274.4, 272.4, 309.6, 245, 72, 214

[56] References Cited

U.S. PATENT DOCUMENTS

| | | | |
|---|---|---|---|
| 1,999,441 | 4/1935 | Clark | 154/2 |
| 2,254,210 | 9/1941 | Cunnington | 154/49 |
| 2,915,427 | 12/1959 | Schriner et al. | 264/546 |
| 3,042,564 | 7/1962 | Hankins | 154/49 |
| 4,721,641 | 1/1988 | Bailey | 428/88 |
| 4,828,898 | 5/1989 | Bailey | 428/88 |
| 4,835,030 | 5/1989 | Squier et al. | 428/88 |

FOREIGN PATENT DOCUMENTS

| | | | |
|---|---|---|---|
| 0115314 | 7/1982 | Japan | 264/511 |
| 2198442 | 9/1987 | Japan | 264/511 |
| 0019346 | 4/1988 | Japan | 264/511 |
| 1165420 | 6/1989 | Japan | 264/511 |

*Primary Examiner*—Jan H. Silbaugh
*Assistant Examiner*—Robin S. Gray
*Attorney, Agent, or Firm*—Foley & Lardner

[57] ABSTRACT

A method for producing a heel mat-attached floor rug for a motor vehicle. A floor rug proper is prepared which has been previously compression-molded to have a three-dimensionally projected portion. Then, the floor rug proper is put on a lower die of a depression-molding device in such a manner that the three-dimensionally projected portion of the rug proper neatly covers a projected portion formed on a shaping surface of the lower die. Then, a heel mat of thermoplastic material is put on a shaping surface of an upper die of the compression-molding device. The shaping surface of the upper die has a depressed portion which is shaped to neatly receive the projected portion of the lower die. Then, the upper die is pressed against the lower die having the heel mat and the floor rug proper put therebetween. Then, a lower surface of the heel mat is melted, by means of high frequency induction welding, thereby to bond the heel mat to the floor rug proper.

9 Claims, 4 Drawing Sheets

METHOD FOR PRODUCING A HEEL MAT-ATTACHED FLOOR RUG FOR A MOTOR VEHICLE

This application is a continuation of application Ser. No. 08/485,835, filed Jun. 7, 1995, abandoned.

BACKGROUND OF THE INVENTION

1. Field of the Invention

The present invention relates in general to methods for producing floor rugs of motor vehicles, and more particularly, to methods for producing vehicular floor rugs of a type having a heel mat bonded thereto. More specifically, the present invention is concerned with a method for bonding, via a high frequency induction welding, a heel mat to an upper surface of a floor rug proper which has been compression-molded in compliance with the contour of a floor panel of a vehicle.

2. Description of the Prior Art

Usually, floor panels of motor vehicles have floor rugs put thereon for not only aesthetic reason but also noise-insulation reason. The floor rugs currently used are of a type which comprises generally a base layer of felt having a cushioning characteristic and an outer aesthetic layer put on the base layer. Some of them are of a compression-molded type. That is, the floor rug including the two layers is subjected to a compression-molding to have a three-dimensionally projected portion which is shaped in compliance with the contour of a vehicle floor panel on which the floor rug is to be set.

Some of the floor rugs of such type have a heel mat of PVC (polyvinyl chloride) bonded to an upper surface thereof. Due to provision of the heal mat, undesired partial abrasion of the floor rug by passenger's shoe heels can be protected.

Hitherto, bonding of the heel mat to the floor rug has been made by manually stretching and flattening the three-dimensionally projected portion of the floor rug, putting a substantially flat heel mat of PVC on the flattened portion of the floor rug and bonding them via a high frequency induction welding.

However, due to its inherence, the above-mentioned conventional bonding method tends to cause an unsightly deformation of the floor rug remained after the welding. That is, because of the resiliency possessed by the heel mat made of PVC, the three-dimensionally projected portion of the floor rug on which the heel mat has been bonded fails to return to its original form even after the high frequency induction welding. If, before being bonded to the floor rug, the heel mat is compression-molded in compliance with the contour of the three-dimensionally projected portion of the floor rug, such drawback may be solved. However, in this case, the labor effectiveness becomes poor due to addition of another compression-molding process.

SUMMARY OF THE INVENTION

Therefore, it is an object of the present invention to provide a method for producing a heel mat-attached floor rug, which is free of the above-mentioned drawbacks.

According to one aspect of the present invention, there is provided a method for producing a heel mat-attached floor rug for a motor vehicle, comprising the steps of (a) preparing a floor rug proper which has been previously compression-molded, the floor rug proper having a three-dimensionally projected portion; (b) putting the floor rug proper on a lower die of a compression-molding device in such a manner that the three-dimensionally projected portion of the rug proper neatly covers a projected portion formed on a shaping surface of the lower die; (c) putting a heel mat of thermo-plastic material on a shaping surface of an upper die of the compression-molding device, the shaping surface of the upper die having a depressed portion which is shaped to neatly receive the projected portion of the lower die; (d) pressing the upper die against the lower die having the heel mat and the floor rug proper put therebetween; (e) melting a lower surface of the heel mat, by means of high frequency induction welding, thereby to bond the heel mat to the floor rug proper.

According to another aspect of the present invention, there is provided a compression-molding device which comprises a lower die having a shaping surface a part of which is projected upward; an upper die positioned above the lower die and vertically movable, the upper die having a shaping surface a part of which is depressed to receive the projected portion of the shaping surface of the lower die when the upper die is intimately put on the lower die, the shaping surface of the upper die being formed with a plurality of apertures which are exposed to a chamber defined in the upper die; a suction pump operatively connected to the chamber of the upper die; and guide means held by the upper die to position a sheet member, which is to be pressed by the compression-molding device, relative to the shaping surface of the upper die.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Before describing the method of the present invention, the product, that is, a heel mat-attached floor rug 100 produced according to the method will be described with reference to FIG. 1(*a*) and FIG. 6.

Figure 6:
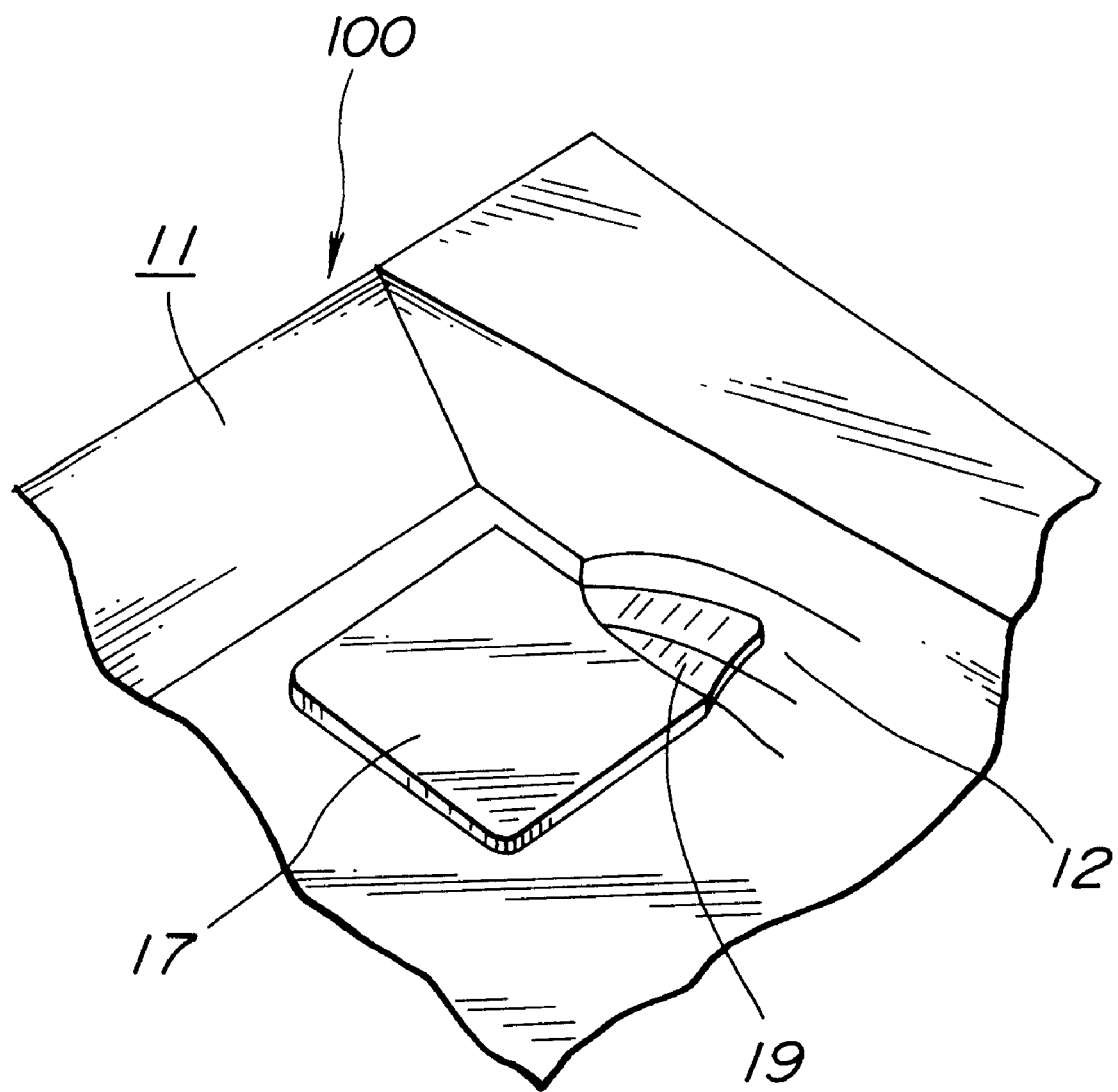
FIG. 6 is a partial and perspective view of a heel mat-attached floor rug produced in accordance with the present invention.

As is seen from these drawings, particularly from FIG. 6, the heel mat-attached floor rug 100 comprises a floor rug proper 11 and a heel mat 17 bonded to an upper surface of the floor rug proper 11. The floor rug proper 11 has a three-dimensionally projected portion 12 shaped in compliance with the contour of a vehicular floor panel. The heel mat 17 has also a three-dimensionally projected portion 19 neatly mated with the projected portion 12 of the floor rug proper 11.

As is seen from FIG. 1(*a*), the floor rug proper 11 comprises a base layer 15 of felt and an outer aesthetic layer 13 which entirely covers an upper surface of the base layer 15.

The heel mat 17 is constructed of a thermoplastic material, such as PVC (polyvinyl chloride) or the like.

Figure 1A:
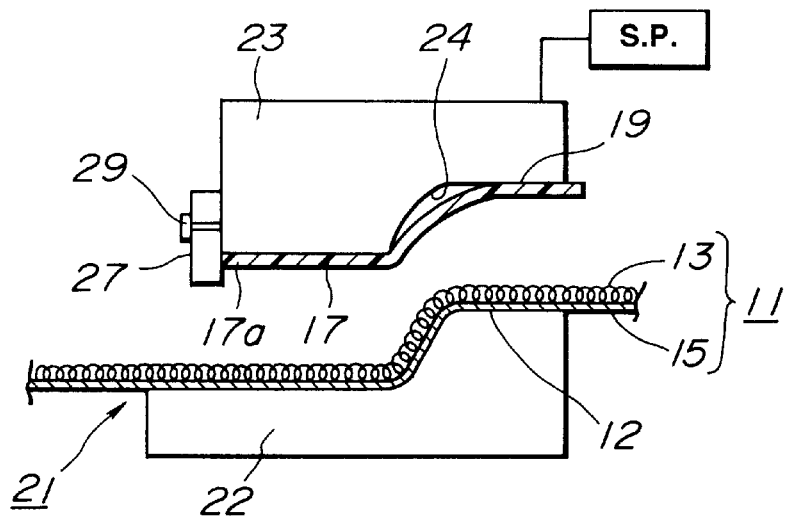
FIGS. 1*a*, 1*b* and 1*c* are drawings of a compression-molding device, showing the steps for bonding a heel mat to a floor rug proper.

For carrying out the method of the invention, a compression-molding device as shown in, for example, FIG. 1(a) is used.

The compression-molding device comprises a fixed lower die 22 and a movable upper die 23. Although not shown in the drawing, a known power mechanism is incorporated with the upper die 23 to move the same vertically.

As shown in FIG. 1(a), the fixed lower die 22 has a shaping surface a part of which is projected upward as shown. The projected part is provided for neatly putting thereon the above-mentioned three-dimensionally projected portion 12 of the floor rug proper 11 (see FIG. 6), as will become apparent as the description proceeds. A high frequency induction welder 21 is arranged on the shaping surface of the lower die 22 in a known manner.

Figure 4:
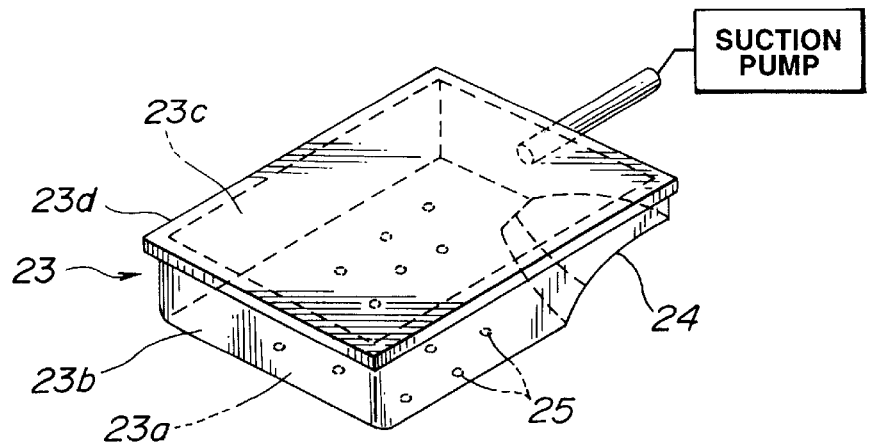
FIG. 4 is an exploded view of the upper die.
Figure 4:
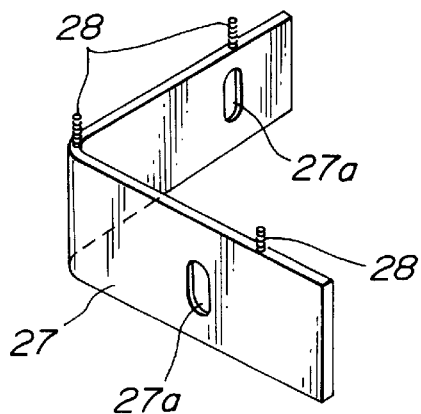

As is seen from FIG. 4, the upper die 23 is of a hollow structure and has a shaping surface 23a. The upper die 23 has a flange 23d at its upper portion. The shaping surface 23a has a depressed portion 24 which is shaped to mate with the above-mentioned projected part of the lower die 22. The shaping surface 23a is provided with a plurality of apertures 25 exposed to the interior of the die 23. The interior of the upper die 23 is connected to a suction pump. Thus, upon operation of the suction pump, surrounding air is drawn into the interior of the upper die 23 through the apertures 25. That is, the upper die 23 is a so-called "vacuum forming die".

Figure 5:
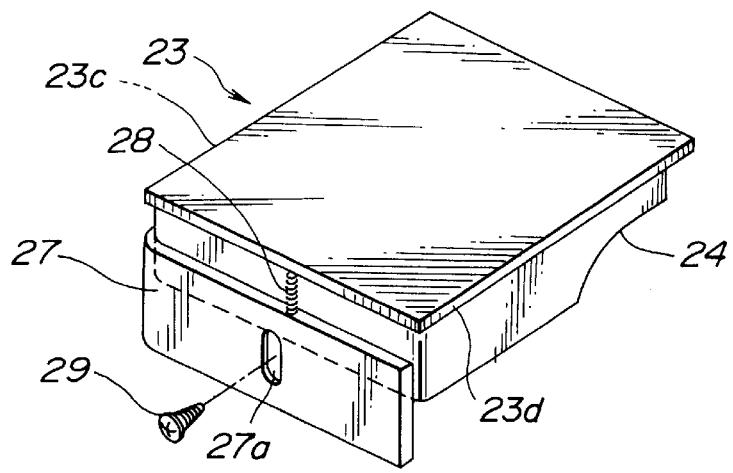
FIG. 5 is a perspective view of the upper die.

As is best understood from FIGS. 4 and 5, a generally L-shaped guide member 27 is movably connected to adjacent side walls 23b and 23c of the upper die 23. The guide member 27 is constructed of an insulating material, such as a plastic or the like and is formed with two elongate slots 27a through which respective guide pins 29 pass and are secured to the side walls 23b and 23c of the die 23. With this, the guide member 27 is vertically movable relative to the side walls 23b and 23c of the die 23. Between the guide member 27 and the upper flange 23d of the upper die 23, there are compressed three coil springs 28 each being held by the guide member 27, as shown in FIG. 4. Due to provision of the coil springs 28, the guide member 27 is biased downward to take a lower position wherein a lower part of the guide member 27 projects downward beyond a lower end of the side walls 23b and 23c.

It is to be noted that the apertures 25 located near the side walls 23b and 23c are greater in number than those located in a center portion of the shaping surface 23a.

If desired, the following modifications may be applied to the above-mentioned compression-molding device.

First, in place of the L-shaped guide member 27, a simple flat plate incorporated with only one side wall 23b or 23c may be used. In this case, the plate should be formed with two parallel elongate slots for achieving a stable vertical movement thereof relative to the side wall 23b or 23c.

Second, if desired, the coil springs 28 may be removed. That is, the guide member 27 can project downward by its own weight.

Third, in place of the guide mechanism including the guide pins 29 and the elongate slots 27a, other guide mechanisms may be used, which are, for example, guide rails slidably interlocked and the like.

In the following, the method for producing the mat-attached floor rug 100 as described hereinabove will be described in detail with reference to the drawings, particularly, FIGS. 1(a), 1(b) and 1(c).

First, a floor rug proper 11 is subjected to a known compression-molding to have a given shape as is shown in FIG. 6. Due to this molding, the floor rug proper 11 has the three-dimensionally projected portion 12. Then, as is understood from FIG. 1(a), the floor rug proper 11 thus shaped is put on the shaping surface of the lower die 22 having the three-dimensionally projected portion 12 thereof neatly put on the projected part of the shaping surface of the die 22. Then, as is seen from the same drawing, a heel mat 17 of PVC is put on the shaping surface of the upper die 23 with an aid of the suction force generated, under operation of the suction pump (S.P.), by surrounding air drawn into the apertures 25.

Figure 2:
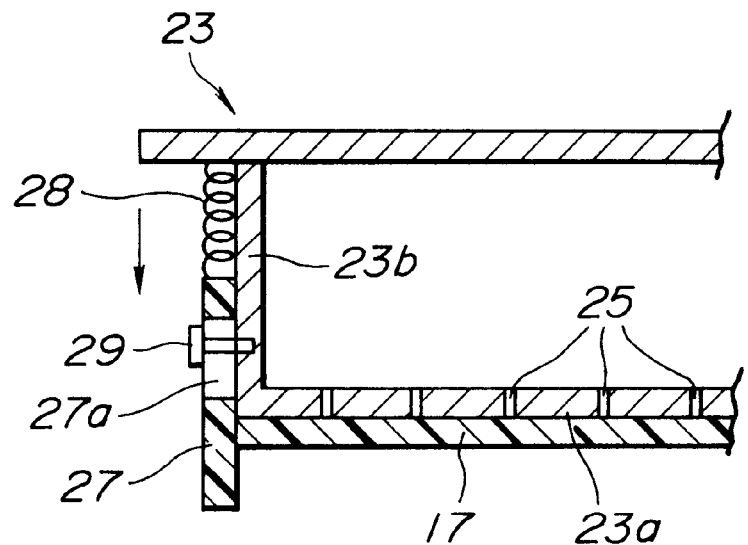
FIG. 2 is a partial and sectional view of an upper die of the compression-molding device used in the method of the present invention.
Figure 3:
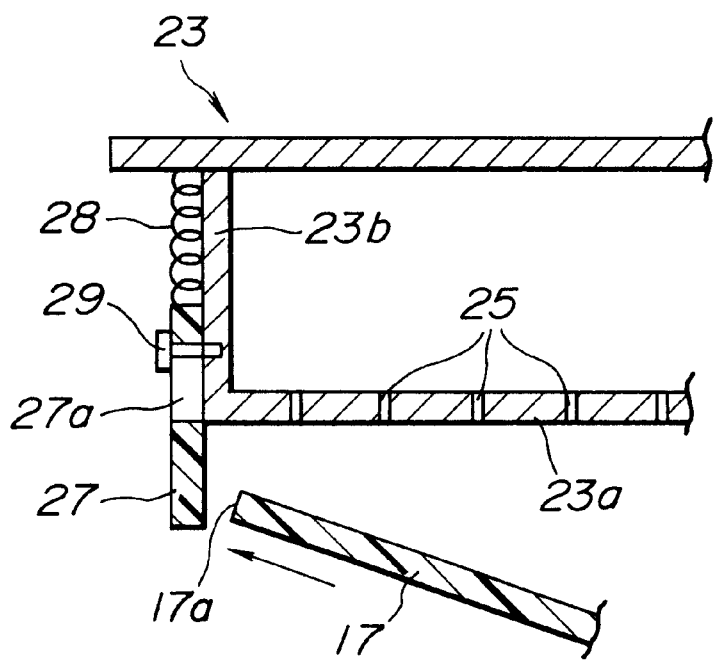
FIG. 3 is a view similar to FIG. 2, but showing a different condition.

As is understood from FIGS. 2 and 3, for positioning the heel mat 17 relative to the shaping surface of the upper die 23, the L-shaped guide member 27 is used, against which side edges 17a of the heel mat 17 abut before energization of the suction pump (S.P.). Because the shaping surface 23a of the upper die 23 has a larger number of air induction apertures 25 near the side walls 23b and 23c, energization of the suction pump brings about a greater suction force with which the peripheral portions of the heel mat 17 having the side edges 17a are attracted to the shaping surface 23a of the upper die 23. Thus, positioning of the heel mat 17 to the upper die 23 is assured.

Figure 1B:
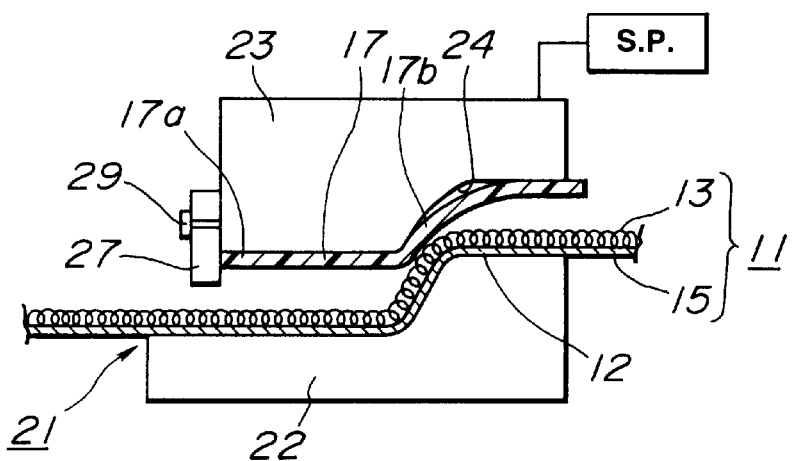

Then, as is seen from FIG. 1(b), with the suction pump (S.P.) kept operated, the upper die 23 is lowered toward the lower die 22. As shown, when the upper die 23 comes near the lower die 22, a part 17b of the heel mat 17 is brought into abutment with the projected portion 12 of the floor rug proper 11 on the lower die 22 and then pressed into the depressed portion 24 of the shaping surface of the upper die 23 by the same. When the downward movement of the upper die 23 is further advanced, the lower end of the L-shaped guide member 27 becomes in contact with the floor rug proper 11 on the lower die 22. Thus, thereafter, the guide member 27 is moved upward relative to the upper die 23 according to the downward movement of the upper die 23.

Figure 1C:
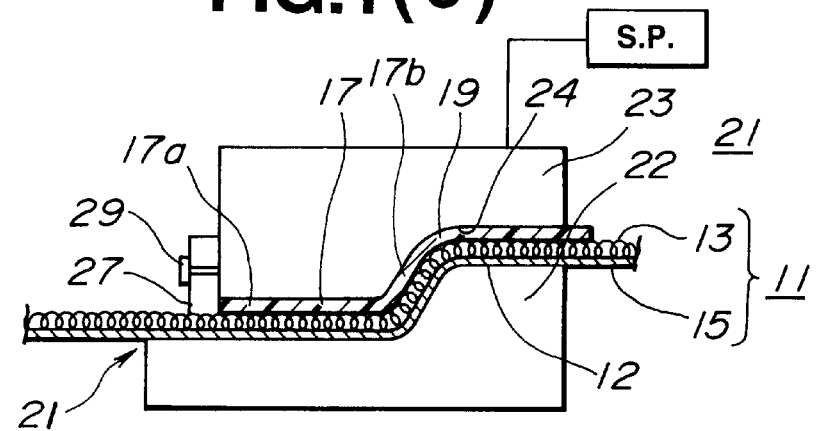

When the upper die 23 is finally put on the lower die 22 as is seen from FIG. 1(c), the suction pump (S.P.) is deenergized. Under this condition, the part 17b of the heel mat 17 is forced to take the three-dimensionally projected shape 19 and the L-shaped guide member 27 takes its uppermost position relative to the upper die 23 against the force of the coil springs 28. Then, the high frequency induction welder 21 is energized. With this, a certain amount of heat is generated which melts a lower surface of the heel mat 17 of PVC, and thus the heel mat 17 is bonded to the floor rug proper 11. Due to the heat thus generated, the heel mat 17 of PVC becomes soften and thus the shaping of the three-dimensionally projected portion 19 thereof is easily achieved.

Then, the upper die 23 is moved upward for removing the product (viz., the heel mat-attached floor rug 100) from the compression-molding device.

If desired, the heel mat 17 may be heated to a certain degree before being pressed by the compression-molding device.

What is claimed is:

1. A method for producing a heel mat-attached floor rug having a three-dimensional projected portion for a motor vehicle, comprising the steps of:

(a) preparing a floor rug proper which has been previously compression-molded, said floor rug proper having a three-dimensionally projected portion;

(b) positioning said floor rug proper on a lower die of a compression-molding device in such a manner that the three-dimensionally projected portion of the floor rug proper covers a projected portion formed on a shaping surface of said lower die;

(c) placing a heel mat of thermoplastic material on a shaping surface of an upper die of said compression-molding device, said shaping surface of the upper die having a depressed portion which is shaped to receive said projected portion of said lower die, said upper die being a vacuum molding die which is connected to a suction pump, said vacuum molding die having a position-adjustable guide member connected thereto to aid in positioning said heel mat against said shaping surface of said vacuum molding die, said guide member being vertically movable with respect to a side wall of said vacuum molding die, said guide member including a biasing means for adjustably positioning said guide member;

(c') vertically moving said guide member downward, using said biasing means, such that a portion of said guide member projects beyond a lower end of said side wall of said vacuum molding die; positioning said heel mat relative to the shaping surface of said vacuum molding die such that an edge of said heel mat is in abutting relationship with an inner surface of said guide member;

(c") holding said heel mat against the shaping surface of said vacuum molding die with air flow produced by energizing said suction pump;

(d) pressing said heel mat held on said vacuum molding die against said floor rug proper on said lower die;

(e) melting a lower surface of said heel mat by means of high frequency induction welding to bond said heel mat to said floor rug proper, thereby forming said heel mat-attached floor rug.

2. The method as claimed in claim 1, wherein said guide member comprises:

elongated slots;

guide pins passing through said elongated slots and secured to said side wall of said vacuum molding die.

3. The method as claimed in claim 2, wherein said guide member is in the shape of an "L", and in which said biasing means includes coil springs.

4. The method as claimed in claim 1, wherein the floor rug proper comprises a base layer of felt and an outer aesthetic layer that covers the base layer.

5. The method as claimed in claim 1, wherein the thermoplastic material of the heel mat comprises polyvinyl chloride.

6. The method as claimed in claim 1, wherein the lower die is fixed and the vacuum molding die is movable.

7. The method as claimed in claim 1, wherein the vacuum molding die has a hollow structure.

8. The method as claimed in claim 1, wherein the shaping surface of the vacuum molding die has a plurality of apertures through which said air flow moves during said stop of energizing said suction pump.

9. The method as claimed in claim 8, wherein a greater number of said plurality of apertures are located near said side wall than are located in a center portion of the shaping surface of the vacuum molding die.

* * * * *